United States Patent

[11] 3,565,178

[72] Inventor Carroll J. Whitfield
 6309 Birling Drive, Columbus, Ga. 31904
[21] Appl. No. 791,904
[22] Filed Jan. 17, 1969
[45] Patented Feb. 23, 1971

[54] PEANUT DIGGER AND SHAKER
 5 Claims, 3 Drawing Figs.
[52] U.S. Cl. .................................................. 171/45,
 171/101, 171/116
[51] Int. Cl. .............................................. A01d 17/08
[50] Field of Search........................................... 171/45, 94,
 101, 116, 83, 5, 110

[56] References Cited
 UNITED STATES PATENTS
1,761,286 6/1930 Zuckerman.................. 171/116

| | | | |
|---|---|---|---|
|2,466,113|4/1949|Knowles........................|171/101|
|2,583,241|1/1952|Tranter et al.................|171/45|
|2,997,114|8/1961|Hines............................|171/101|

Primary Examiner—Antonio F. Guida
Attorney—Jones and Thomas

ABSTRACT: A peanut vine digger and shaker comprising a pair of crop elevating rattlers positioned in side-by-side relationship and supported by a framework, and rattler drive means positioned generally between the rattlers and arranged to drive the rattlers from the power source of a tractor or the like. A pair of plows are connected to the framework ahead of each of the rattlers, and a pair of coulters are positioned between and ahead of the rattlers for cutting the vines just before the vines are plowed from the ground and shaken by the rattlers.

INVENTOR.
CARROLL J. WHITFIELD
BY Jones & Thomas
ATTORNEYS

PATENTED FEB 23 1971

INVENTOR.
CARROLL J. WHITFIELD

BY
Jones & Thomas

ATTORNEYS 3,565,178

PEANUT DIGGER AND SHAKER

BACKGROUND OF THE INVENTION

When harvesting peanuts, the peanut vines traditionally have been plowed from the ground, the dirt shaken from the vines, and the vines stacked in windrows for drying. Various farm machines have been developed for automatically digging, shaking, and forming windrows of the peanut vines; however, the equipment developed so far is limited in its operation to only two adjacent rows of peanut vines. When attempting to operate equipment constructed to dig and shake more than two adjacent rows of vines, the power requirements for operating the rattlers and urging the plow shares through the ground where found to be excessive, and the vines frequently tangled in the equipment so as to render the equipment temporarily inoperative. Thus, successful maintenance-free digging and shaking of peanut vines has been limited to double row operation.

SUMMARY OF THE INVENTION

Briefly described, the present invention comprises a peanut vine digger and shaker which is operable to dig four rows of peanut vines from the soil, shake the vines, and form one or two windrows of vines. A plow is provided for each row of vines, and the plows on one side of the apparatus guide the vines from a pair of rows on one side of the apparatus to one shaker, while the plows on the other side of the apparatus guide the vines from the other pair of rows to the other shaker. A pair of coulters are positioned ahead of the center plows at a position ahead of and between the shakers to cut the vines and vine roots in the path ahead of the apparatus to divide the vines and roots into separate rows so they can be dug and lifted from the soil without entanglement among themselves or among the equipment. The drive mechanism extends straight back from the power take off of the tractor, and no lateral drive extension is required.

Thus, it is an object of this invention to provide a peanut vine digger and shaker which functions to dig and shake four rows of peanut vines simultaneously without having the peanut vines and roots becoming entangled with the apparatus.

Another object of the invention is to provide apparatus for simultaneously digging and shaking four rows of peanut vines from the soil without requiring excessive motive power to operate the apparatus.

Another object of this invention is to provide apparatus for expediently and inexpensively digging, shaking, and forming windrows of peanut vines.

Other objects, features, and advantages of the present invention will become apparent upon reading the following specification, when taken in conjunction with the accompanying drawing.

DESCRIPTION OF THE PREFERRED EMBODIMENT

Figure 1:
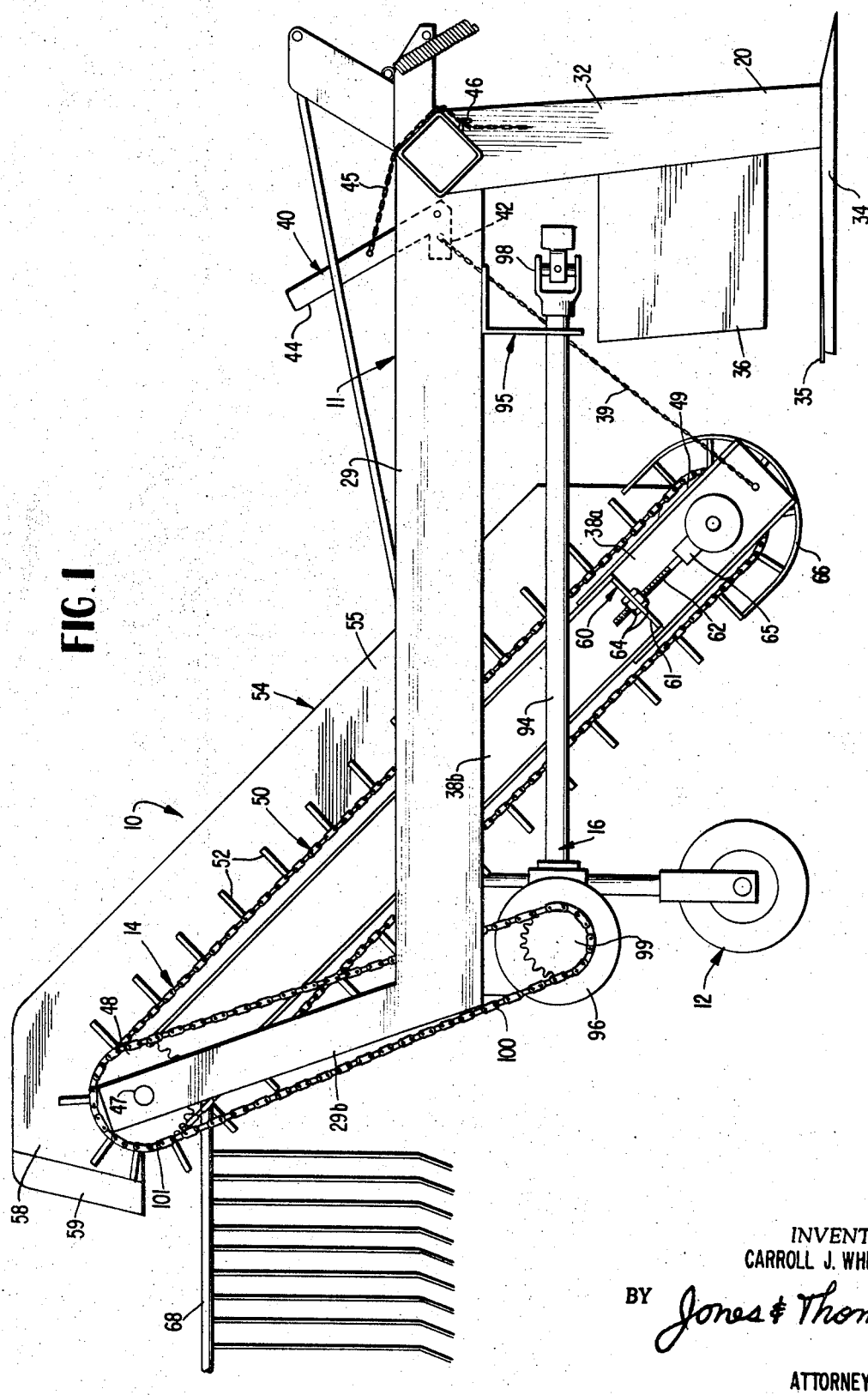
FIG. 1 is a side cross-sectional view of a peanut digger and shaker, taken along the center line of the apparatus.
Figure 2:
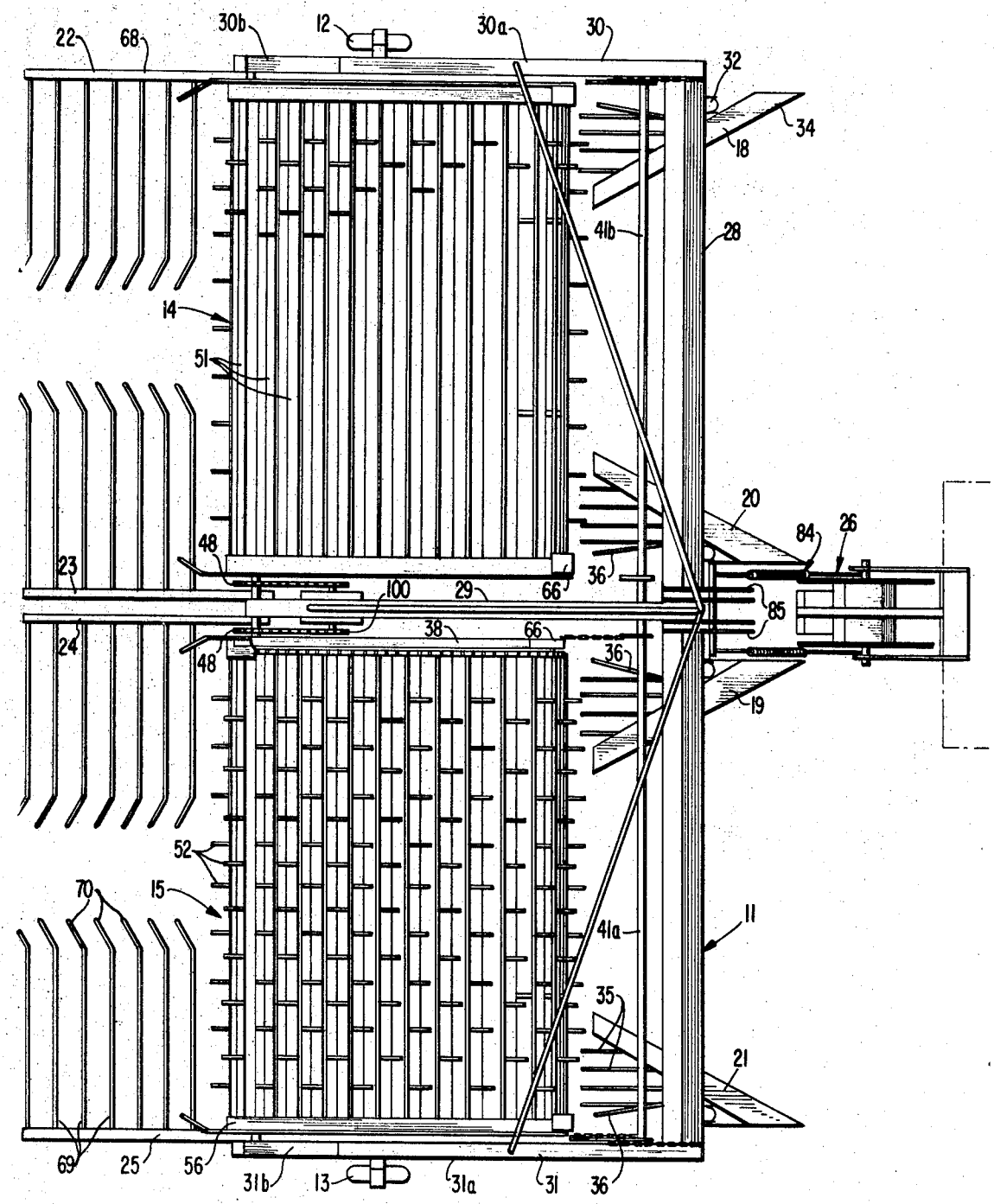
FIG. 2 is a top view of the peanut digger and shaker.

Referring now in more detail to the drawing, in which like numerals indicate like parts throughout the several views, FIGS. 1 and 2 show peanut vine digger and shaker 10 which includes the framework 11, wheel assemblies 12 and 13, a rattlers 14 and 15, drive train 16, plows 18, 20, 19, and 21, guide tine assemblies 22,24, and 23,25, and coulter assembly 26. Framework 11 includes laterally extending tool bar 28 and longitudinally extending support bars 29, 30, and 31. Support bars 29—31 are each connected to tool bar 28, and extend rearwardly of digger shaker 10 in a horizontal direction, and then extend in an upward direction, so that they comprise, respectively, horizontal sections 29a, 30a, and 31a, and angled sections 29b, 30b, and 31b. Wheel assemblies 12 and 13 each are connected to the horizontal sections 30a and 31a of support bars 30 and 31 respectively. Wheel assemblies 12 and 13 are adjustable vertically and horizontally along horizontal sections 30a and 31a with respect to framework 11, so as to position the framework at different elevations.

Each plow 18—21 includes a downwardly extending support stanchion 32 (FIG. 1) which is connected at its upper end to tool bar 28 and slopes in a downward and forward direction toward the ground. A plow share 34 is connected to the lower end of each stanchion 32 and comprises a flat blade positioned in a plane generally disposed parallel to the horizontal, and a series of tines 35 are connected to the trailing edge of each plow share 34 and slope in an upward and rearward direction therefrom. A fender 36 is connected to each stanchion 32 and extends generally in a vertical plane and is oriented toward the center of each rattler 14 and 15.

Rattlers 14 and 15 each include a pair of side frames 38 which are pivotally connected at their upper ends to the upper end of angled sections 29b, 30b, and 31b of support bars 29, 30, and 31 of framework 11. The lower ends of side frames 38 are each supported by chains 39 of each of which are connected at their lower ends to side frames 38, and at their upper ends to rattler adjusting mechanism 40. Rattler adjusting mechanism 40 includes a pair of rotatable control bars 41a and 41b which extend coaxially through horizontal sections 29a and 31a, and through 29a and 30a respectively, of support bars 29—31. Chain connecting straps 42 are connected at intervals along control bars 41a and 41b which correspond to the placement of side frames 38 of rattlers 15, and operating handles 44 are positioned at the outer ends of control bars 41a and 41b adjacent support bars 30 and 31. Retaining chains 45 extend between handles 44 and tool bar 28, and are connectable to tool bar 28 by means of hooks 46. With this arrangement, the angles of rattlers 14 and 15 can be adjusted by disengaging retaining chains 45 from retaining hooks 46 of tool bar 28 and rotating handles 44 about control bars 41a and 41b which causes rotational movement of chain straps 42 and corresponding movement of the chains and of the lower ends of rattlers 14 and 15.

Each rattler 14 and 15 includes driven sprockets 48 at their upper ends, adjacent side frames 38, and idler sprockets 49 at their lower ends. Conveyor chains 50 extend about driven sprockets 48 and idler sprockets 49, and vine retrieving bars 51 extend between chains 50 of each rattler. A series of vine engaging spikes 52 extend outwardly from each bar 51.

A rattler fender 54 is connected to each side frame 38 of each rattler 14, and 15, and includes upright portion 55 and inwardly extending flange portion 56. Each flange portion 56 is positioned to extend over a rattler conveyor chain 50, while each upright portion 55 is arranged to confine the vines moving over a rattler to the area on the above each rattler. The upper exhaust ends 58 of each rattler fender 54 extend beyond the rattlers and are angled inwardly at 59 of each rattler 14 and 15 to guide the vines carried by the rattlers toward the centerline of the rattlers.

Side frames 38 of each rattler 14 and 15 are adjustable in their lengths by adjusting mechanism 60. Side frames 38 are C-shaped in cross section, and the lower portions 38a of each side frame 38 is positioned in telescoping relationship with the main portion 38b. Adjusting mechanism 60 includes flange 61 extending from main portion 38b of each side frame 38, and threaded adjusting shank 62 which extends through flange 61 and is adjustably connected thereto by means of nuts 64. Threaded shank is connected to support block 65 of lower portion 38a of side frame 38. With this arrangement, the lower portions 38a of each side frame 38 can be moved with respect to the main portion 38b by manipulation of nuts 64 of adjusting mechanism 60, which is effective to tighten or loosen the conveyor chains 50 of the rattlers.

Arcuate ground engaging shoes 66 are connected to the lower portion 38a of each side frame 38. Shoes 66 function to protect the lower portion of side frames 38, and to lift the lower portion of the rattler over any obstruction that might be encountered by the movement of the digger shaker 10 through the field.

Guide tine assemblies 22, 23, 24 and 25 are each connected to a side frame 38 and each includes a support bar 68 and a plurality of spaced tines 69 extending in a downward direction from support bar 68 and sloping toward the centerline of each rattler 14 and 15. The lower end of each tine 69 is angled at 70 in a direction that extends behind digger shaker 10. In some instances only tine assemblies 22 and 25 with longer tines are furnished, as described hereinafter.

Figure 3:
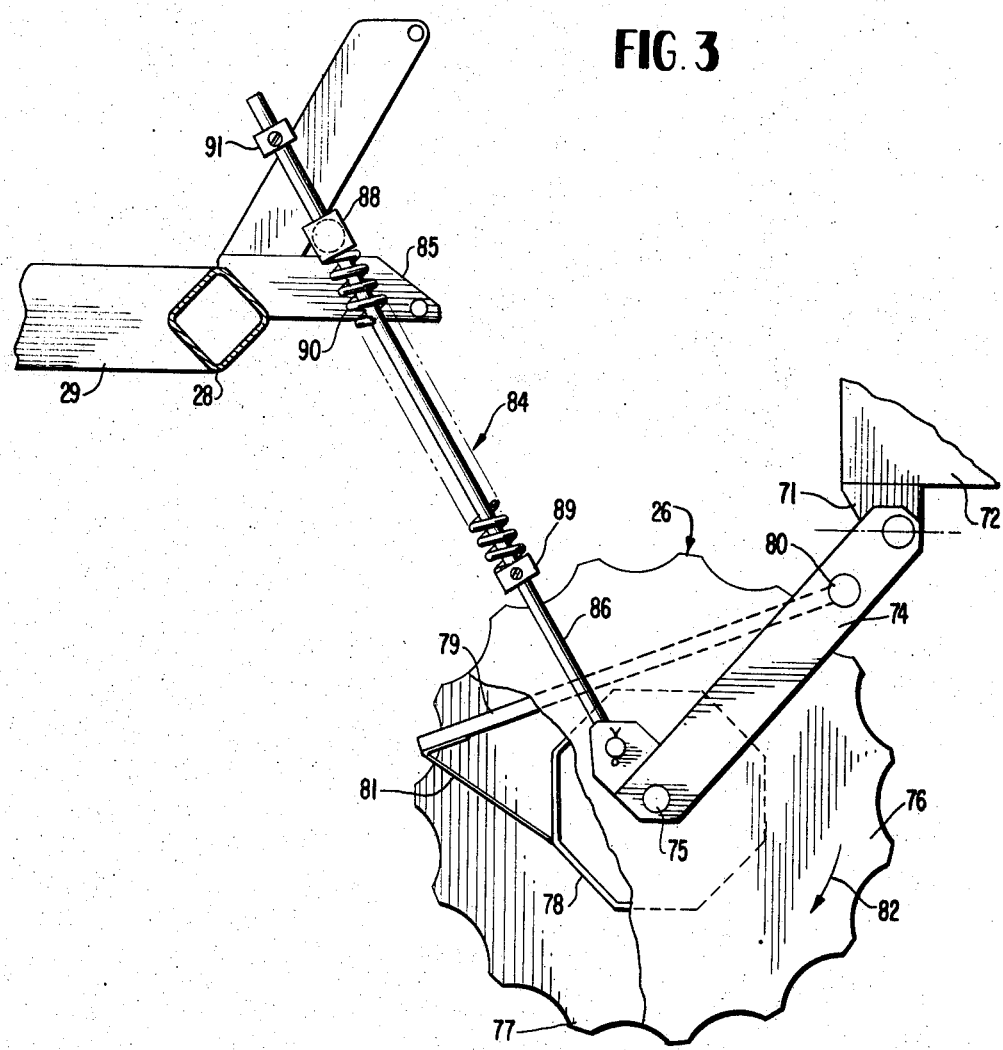
FIG. 3 is a side elevational view, with parts broken away, of the coulter assembly.

As is best shown in FIGS. 2 and 3, coulter assembly 26 includes support bar 71 which is connectable to the frame of a tractor or similar vehicle 72. A pair of pivotable support arms 74 are spaced apart and connected to the ends of support bar 71. Axle 75 extends through the other ends of pivotable support arm 74. A pair of coulter discs 7 and 77 are mounted on axle 75, and coulter spool 78 is rigidly connected to coulter spool 77 inwardly of their peripheries. Coulter spool 78 surrounds axle 75, and functions to protect axle 75 during the operation of coulter assembly 26, and acts as a gauge to limit the depth of penetration of the coulter discs in soft solids soils. Also, coulter spool 78 compresses the cut vines, foilage and debris passing between the coulter discs so this material will pass between plows 19 and 20 without clogging or becoming tangled in the machine. Coulter discs 76 and 77 are serrated to enhance their cutting ability. Scraper support arm 79 is rigidly connected at its upper end to brace 80 between support arms 74, and scraper plate 81 is connected to the lower end of scraper support arm 79. Scraper support arm 79 extends from pivotable support arms 74 on one side of coulter assembly 26 in a downward direction over the assembly to the other side thereof, and scraper plate 81 extends from the lower end of scraper support arm 79 i back into engagement with coulter spool 78. When coulter discs 77 engage the soil and the tractor 72 moves the discs through the soil, coulter discs 76 and 77 will rotate in the direction as indicated by arrow 82, and scraper plate 81 will ride adjacent coulter spool 78 and function to remove any vines, clods of dirt, or other debris that might be wedged between or adhering to coulter discs 76 and 77 or coulter spool 78.

Pressure rod assemblies 84 are connected between the lower ends of pivotable support arms 74 of coulter assembly 26 and tool bar mounts 85. Each pressure rod assembly 84 includes a rod 86 connected at its lower end to a pivotable support arm 74, and each rod 86 extends through a slide block 88 connectable to a tool bar mount 85. A collar 89 is rigidly connected to each rod 86, and a compression spring 90 extends between each collar 89 and its slide block 88. A retaining collar 91 is connected to the upper end of each rod 86. With this arrangement, the compression springs 90 function to urge rods 86 in a downward direction through slide blocks 88, until retaining collars 91 engage slide blocks 88. This causes coulter discs 76 and 77 to pivot with pivotable support arms 74 about support bar 71 in a counterclockwise direction (FIG. 3), which is generally into the soil. When the tractor 72 lifts tool bar 28, retaining collars 91 of pressure rod assemblies 84 limit the downward movement of the coulter assembly and causes rod 86 to lift coulter assembly 26 from the soil; however, when tractor 72 allows tool bar 28 to move in a downward direction so that coulter discs 76 and 77 engage the soil, slide block 88 would allow rod 86 to move therethrough except for the force exerted by compression springs 90, which urge the coulter discs into the soil. When coulter discs 76 and 77 are moved through hard soil or when they engage an obstruction in the soil, coulter assembly 26 will pivot about its support bar 71 against the compression of spring 90. With this arrangement coulter discs 76 and 77 are urged into the soil with a substantially uniform force, yet the discs will be allowed to withdraw from the soil and the coulter discs will not be inadvertently damaged by striking hard objects.

As coulter assembly 26 is drawn through the soil between adjacent rows of peanut vines, the discs function to cut the vines extending between adjacent rows and the subterranean roots of the vines, so that plows 19 and 20 will uproot the vines and guide the vines toward either rattler 14 or rattler 15. Coulter assembly 26 functions to divide or separate the vines of adjacent rows of vines.

When single coulter disc is used to penetrate the soil to cut vines or vine roots, there are occasions when the vines or the vine roots will be urged down into the soil but will not be severed by the disc. This usually happens in loose or soft soil conditions where the vine or vine root can move in a downward direction away from the cutting motion of the coulter disc, and can move along its length to allow the downward movement. When a pair of coulter discs are utilized in the closely spaced side-by-side arrangement as shown in the drawing, both of the coulter discs usually engage the vines and vine roots, and each disc tends to hold and prevent the vine or root from moving along its length at its point of contact. This usually prevents the vine or vine root from moving down into the soil away from the discs and the discs can perform the cutting function. The usual result is that all of the vines and vine roots contacted by the coulter disc are cut.

As shown in FIG. 1, drive train 16 includes drive shaft 94 which extends parallel to and is spaced below center support bar 29. Support bracket 95 supports the forward end of drive shaft 94 from the lower surface of support bar 29 and transmission 96 is connected to the rear end of drive shaft 94 and is supported from the bottom surface of support bar 29. A universal joint 98 is connected to the forward end of drive shaft 94 and arranged to be connected to the power takeoff shaft of the tractor. Transmission sprockets 99 are positioned on the opposite sides of transmission 96 and function to drive rattler drive chains 100. Rattler driving sprockets 101 are connected to the drive shaft 47 of each rattler 14 and 15 and are driven by rattler drive chains 100. Transmission 96 is positioned below center support bar 29 at the junction or horizontal section 29a with angled section 29b, and the level below the rattlers 14 and 15. Rattler drive chains 100 are spaced closely to angled section 19b of support bar 29. This arrangement is such that rattlers 14 and 15 can be positioned close to each other, and plows 19 and 20 and coulter discs 76 and 77 can also be spaced close to each other. Thus, peanut digger shaker can operate between rows of peanuts that are very closely spaced to each other. Also, drive trains 16 extends directly behind the power takeoff of the tractor, which reduces the power requirements that might be required of the machine if the driving components were directed around the working parts of the machine.

OPERATION

When the tractor pulls peanut digger shaker through the crop, plow shares 34 of each plow 18—21 penetrate the soil at a level beneath the crop and lifts the crop and some of the top soil from the earth. Plows 18—21 are spaced apart so that they are in alignment with the rows of the crop, and four rows can be plowed simultaneously. As the crop is lifted from the soil, it moves over the upper surface of each plow shares 34 and onto the incline of tines 35. As the crop moves over tines 35, a portion of the soil extracted from the earth will fall between the tines back onto the ground surface. As the crop moves off the end of tines 35, the spikes 52 of rattlers 14 and 15 engage the roots, vines, and foilage, and carry the crop up the upper flight of the rattlers. This movement further shakes and loosens the soil from the plants. The plow fenders 35 of plows 18—21 function to guide the plants onto the rattlers, so the plants will not become tangled with the moving parts of the machine. As the plants move up the upperflights of the rattlers, rattler fenders 54 retain the plants on the rattlers and also prevent the plants from becoming tangled with the other moving parts of the machine. As the plants are elevated, they are vibrated so that the soil tends to fall between the rattler bars to the ground. As the plants are carried over the upper end of the rattlers, the plants drop onto guide tine assemblies 22—25.

This motion and impact causes further soil removal from the plants. As the plants slide down tine 69, the soil continues to become separated from the crop. The angled ends 70 of tines 69 function to further tumble the plants, so that the vines are substantially free of soil at this point and two windrows of plants are formed. If only a single windrow is desired, tine assemblies 23 and 24 can be removed and tine assemblies 22 and 25 replaced with assemblies having longer tines which form a single row of plants along the center line of the apparatus.

When it is desired to raise or lower the lower end of the rattlers, either handle 44 of rattler adjusting mechanism 40 can be rotated to rotate control bar 41a and 41b and their chain straps 42, whereupon chains 39 will lift or lower rattlers 14 and 15. When the desired position is reached, retaining chains 45 can be anchored on their retaining hooks 46. If the lower end of side frames 38 of rattlers 14 and 15 should engage an obstruction, shoes 66 at the lower ends of the side frames will guide the lower ends of the rattlers over the obstruction, usually without damage to the rattler.

Framework 11 of digger shaker 10 is constructed so that it is maintained at a level high above the ground surface and the crop. Thus, there is virtually no hazard of the framework damaging the crop. Furthermore, since drive shaft 94 extends generally parallel to the direction of movement of the apparatus and parallel to the crop row, there is little hazard of any vine entanglement about the drive shaft. Also, the length of the rattler drive chains 100 is relatively short, their arrangement is in a plane parallel to the normal direction of movement of the digger shaker, and they are located at a position well out of the way of the movement of the vines, so the vines will rarely be tangled with the chains.

Coulter assembly 26 functions to separate the vines extending from adjacent rows of vines to positively separate the vines from each other. The joint action of coulter discs 76 and 77 is such that each coulter disc tends to hold a vine or a vine root from longitudinal movement through the soil and downward movement into the soil so the cutting function of the discs is not impaired. Scraper plate 81 prevents vines, dirt clods, or other debris from becoming wedged between coulter discs 76 and 77. Pressure rod assembly 84 assures positive engagement of coulter assembly 26 with the soil while it allows the assembly to withdraw from the soil when it encounters an obstruction, or the like. Coulter spool 78 protects axle 75, acts as a gauge to limit the depth of penetration of the coulter discs in soft soil, and compresses the cut vines, foilage and debris passing between the coulter discs so this material will pass between plows 19 and 20 without impeding the function of the machine.

At this point, it should be apparent that digger shaker 10 is effective to simultaneously dig and shake four rows of peanuts from the soil, and the mechanical arrangement is such that this function is achieved with minimum power requirements and with virtually no hazard of vine entanglement with the apparatus.

While the invention has been disclosed as embodying two rattler conveyors, it will be understood that the invention can be embodied with one or more rattler conveyors, and that a coulter assembly can be used between any two adjacent rattlers, or in combination with various other equipment.

While this invention has been described in detail with particular reference to preferred embodiments thereof, it will be understood that variations and modifications can be effected within the spirit and scope of the invention as described hereinbefore and as defined in the appended claims.

I claim:

1. A peanut digger and shaker comprising a framework adapted to be secured to a tractor or the like, a pair of crop elevating rattlers positioned in side-by-side relationship and supported by said framework, and rattler drive means positioned between said rattlers and arranged to drive said rattlers from a power source of the tractor or the like, said rattlers each comprising a sloped conveyor with an upper drive axle and a lower idler axle, and said drive means comprising a power takeoff shaft extending from the forward portion of the digger and shaker between the rattlers to a position below said drive axles, a transmission positioned generally below and between said rattlers and connected to said power takeoff shaft, and drive means connected between said transmission and each of the drive axles of said sloped conveyors.

2. The invention of claim 1 and further including a pair of plows positioned ahead of and spaced apart in front of each rattler, and at least one coulter disc positioned ahead of and substantially between adjacent plows of said pair of plows.

3. The invention of claim 2 wherein said at least one coulter disc comprises a pair of spaced coulter discs of similar size joined together in approximately parallel planes to form an integral structure.

4. The invention of claim 2 wherein said at least one coulter disc includes a coulter support means for pivotal connection to a tractor or the like, and resilient means connected to said framework for urging said at least one coulter disc into the ground while allowing movement of said coulter disc with respect to said framework.

5. A peanut shaker or the like comprising a framework, constructed and arranged to be pulled in a forward direction by a tractor or the like, a pair of crop conveyors positioned in side-by-side relationship and supported by said framework in a downwardly and forwardly extending incline, conveyor drive means comprising a power takeoff shaft extending from a forward portion of the shaker and extending between said conveyors, transmission means positioned generally below and between said conveyors and connected to said power takeoff shaft, and drive means connected between said transmission means and said conveyors.